(12) United States Patent
Boland

(10) Patent No.: US 10,189,444 B2
(45) Date of Patent: Jan. 29, 2019

(54) WINDSCREEN WIPER ARM

(75) Inventor: Xavier Boland, Arlon (BE)

(73) Assignee: Federal-Mogul S.A., Arlon (BE)

( * ) Notice: Subject to any disclaimer, the term of this patent is extended or adjusted under 35 U.S.C. 154(b) by 324 days.

(21) Appl. No.: 14/409,701

(22) PCT Filed: Jun. 21, 2012

(86) PCT No.: PCT/EP2012/061914
§ 371 (c)(1),
(2), (4) Date: Feb. 12, 2015

(87) PCT Pub. No.: WO2013/189539
PCT Pub. Date: Dec. 27, 2013

(65) Prior Publication Data
US 2015/0336541 A1  Nov. 26, 2015

(51) Int. Cl.
*B60S 1/34* (2006.01)

(52) U.S. Cl.
CPC ............. *B60S 1/3456* (2013.01); *B60S 1/345* (2013.01); *B60S 1/3436* (2013.01); *B60S 1/3438* (2013.01); *B60S 1/3468* (2013.01); *Y10T 29/49842* (2015.01)

(58) Field of Classification Search
CPC ...... B60S 1/3436; B60S 1/3438; B60S 1/345; B60S 1/3456
USPC .................................... 15/250.351, 250.352
See application file for complete search history.

(56) References Cited

U.S. PATENT DOCUMENTS

2006/0254018 A1* 11/2006 Losch ...................... B60S 1/32
 15/250.351
2007/0011840 A1*  1/2007 Gilli ..................... B60S 1/3889
 15/250.352

FOREIGN PATENT DOCUMENTS

| DE | 19951440 A1 | 5/2001 |
| EP | 0755833 A1 | 1/1997 |
| EP | 1514752 A1 | 3/2005 |

* cited by examiner

*Primary Examiner* — Andrew A Horton
(74) *Attorney, Agent, or Firm* — Robert L. Stearns; Dickinson Wright, PLLC

(57) ABSTRACT

A windscreen wiper arm, particularly for automobiles, includes a mounting head mountable on a drive shaft and an arm member pivotally connected to the mounting head by means of a pivot pin. The arm member has a substantially U-shaped cross-section near the pivot pin comprising two side walls. A part of the mounting head extends between the side walls and beyond the pivot pin. Protrusion/groove features are provided on the part and the side walls for limiting a pivot angle of the arm member. The protrusion/groove means comprise at least one groove and at least one protrusion cooperating with the groove, the protrusion is movable in the groove between a first position corresponding with a wiping position of the arm member and a second position corresponding with a mounting position of the arm member. The part is provided with opposite abutting surfaces for abutting against the side walls. The protrusion extends laterally inwardly from one of the side walls into the groove being provided on one of the abutting surfaces abutting against that respective side wall. The groove has a width larger than a width of the protrusion.

14 Claims, 8 Drawing Sheets

WINDSCREEN WIPER ARM

BACKGROUND OF THE INVENTION

Technical Field

The present invention relates to a windscreen wiper arm, particularly for automobiles, comprising a mounting head mountable on a drive shaft and an arm member pivotally connected to the mounting head by means of a pivot pin, wherein the arm member has a substantially U-shaped cross-section near the pivot pin comprising two side walls, wherein a part of the mounting head extends between the side walls and beyond the pivot pin, wherein protrusion/groove means are provided on the part and the side walls for limiting a pivot angle of the arm member, wherein the protrusion/groove means comprise at least one groove and at least one protrusion cooperating with the groove, wherein the protrusion is movable in the groove between a first position corresponding with a wiping position of the arm member and a second position corresponding with a mounting position of the arm member, wherein the part is provided with opposite abutting surfaces for abutting against the side walls, and wherein the protrusion extends laterally inwardly from one of the side walls into the groove being provided on one of the abutting surfaces abutting against that respective side wall.

Such a windscreen wiper arm is known from European patent publication no. 1 514 752 of the same Applicant. In this known windscreen wiper arm a cylindrical protrusion extends laterally inwardly from a side wall of the U-shaped arm member into a guiding groove being provided on an abutting surface of the mounting head abutting against the side wall. The guiding groove has a shape of a quarter of a circle, for example. When the arm member is pivoted relative to the mounting head from a first position facing towards a windscreen to be wiped (that is a wiping position) to a second position facing away from a windscreen to be wiped (that is a mounting, cleaning and/or repair position, for example), the protrusion is guided by the guiding groove until a maximum pivot angle is reached. In that case, the protrusion is stopped/blocked by a wall of the guiding groove, so that the arm member cannot be pivoted vis-a-vis the mounting head beyond the maximum pivot angle. According to this prior art publication it is allowed to mount windscreen wiper arms mutually only differing in the sense that only the shape (particularly the effective length) of the groove is modified by using a small modification in the respective mould, on every type of car.

It is noted that the present invention is not restricted to cars, but also refers to rail coaches and other (fast) vehicles.

In practice it has become apparent that dimensions of the cylindrical protrusion on the arm member and of the guiding groove in the shape of a part of a circle on the mounting head have to be carefully geared to one another. This would require carefully made moulds, particularly a mould for manufacturing the mounting head equipped with the guiding groove.

SUMMARY OF THE INVENTION

It is an object of the invention to obviate this disadvantage, in the sense that at minimum costs—without using complex machinery and additional tools—windscreen wiper arms with mutually minimum modifications are proposed, which can be easily manufactured and which can be mounted on different cars.

Thereto, according to the invention a windshield wiper arm mentioned in the preamble is characterized in that the groove has a width larger than a width of the protrusion. Consequently, the protrusion is movable in the groove between the first and second positions without making contact with side walls of the groove. Only in the second position the protrusions rests against an end wall of the groove.

The protrusion is in one piece with the U-shaped arm member and preferably has a shape corresponding to a shape of the end wall of the groove. the protrusion is allowed to slide inside the groove between the first and second positions, without being guided by the side walls of the groove (i.e. without making physical contact therewith). In the second position or "service position" (that is a mounting, cleaning and/or repair position) the protrusion abuts against the end wall of the groove, whereas in the first position or "work position" (that is a wiping position) the protrusion is spaced-apart from the end wall of the groove. the protrusion and the end wall of the groove each form a stop surface avoiding that in the second position the arm member is allowed to be pivoted beyond a predetermined angle with respect to the mounting head. As both stop surfaces are part of rigid elements of the windscreen wiper arm, namely the rigid arm member and the rigid mounting head, respectively, both stop surfaces are relatively large and strong and thus very effective.

Further, no extra tool step in manufacturing the U-shaped arm member is now needed, whereas no extra raw material is now used.

Particularly, the protrusion is allowed to move in the groove between the first position and the second position along a path formed by a part of a circle, wherein the protrusion is spaced-apart from side-walls of the groove during the movement. In other words, during movement of the arm member relative to the mounting head, the protrusion is always located at a distance from the side walls of the groove. Only in the mounting (upright) position of the arm member relative to the mounting head (i.e. in the second position of the protrusion) the protrusion rests against the end wall of the groove.

In a preferred embodiment of a windscreen wiper arm in accordance with the invention the groove is provided with a curved end wall, wherein a side wall of the groove facing away from the pivot pin and adjacent to the end wall extends along a straight line. Particularly, the side wall of the groove facing away from the pivot pin encloses an acute angle a with the horizontal plane, and wherein the acute angle a is chosen between 20° and 85°.

In another preferred embodiment of a windscreen wiper arm according to the invention the end wall extends along a part of a circle.

In another preferred embodiment of a windscreen wiper arm in accordance with the invention a side wall of the groove facing towards the pivot pin comprises a first wall portion adjacent to the end wall and extending along a straight line, as well as a second wall portion adjacent to the first wall portion, wherein the first and second wall portions enclose an obtuse angle β.

In another preferred embodiment of a windscreen wiper arm according to the invention the first wall portion of the side wall of the groove facing towards the pivot pin encloses an acute angle γ with the horizontal plane, and wherein the acute angle γ is chosen between 37° and 120°.

In another preferred embodiment of a windscreen wiper arm in accordance with the invention the arm member is made of a metal material, preferably steel. Preferably, the mounting head is made of a metal material, preferably aluminium.

The present invention also refers to a mounting head and/or an arm member as defined in a windscreen wiper arm according to the invention.

Further, the present invention is also directed to a windscreen wiper device comprising a windscreen wiper arm in accordance with the invention. Particularly, the windscreen wiper device comprises an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, wherein ends of the longitudinal strip are connected by a respective connecting piece, which windscreen wiper device comprises a connecting device for the windscreen wiper arm according to the invention. Such a windscreen wiper device is thus designed as a "yokeless" wiper device or "flat blade", wherein use is no longer made of several yokes pivotally connected to each other, but wherein the wiper blade is biassed by the carrier element, as a result of which it exhibits a specific curvature. It is noted that the present invention is not restricted to such a "yokeless blade" or "flat blade", although being advantageous therein, but also extends to other types of windscreen wiper devices, such as the ones with yokes as referred to above.

Finally, the present invention relates to a method for manufacturing a windscreen wiper arm, particularly for automobiles, comprising a mounting head mountable on a drive shaft and an arm member pivotally connected to the mounting head by means of a pivot pin, wherein the arm member has a substantially U-shaped cross-section near the pivot pin comprising two side walls, wherein a part of the mounting head extends between the side walls and beyond the pivot pin, wherein protrusion/groove means are provided on the part and the side walls for limiting a pivot angle of the arm member, wherein the protrusion/groove means comprise at least one guiding groove and at least one protrusion cooperating with the groove, wherein the protrusion is movable in the groove between a first position corresponding with a wiping position of the arm member and a second position corresponding with a mounting position of the arm member, wherein the part is provided with opposite abutting surfaces for abutting against the side walls, and wherein the protrusion extends laterally inwardly from one of the side walls into the groove being provided on one of the abutting surfaces abutting against that respective side wall, characterized in that the groove has a width larger than a width of the protrusion.

THE DRAWINGS

The invention will now be explained in more detail with reference to figures illustrated in a drawing, wherein.

Figure 5:
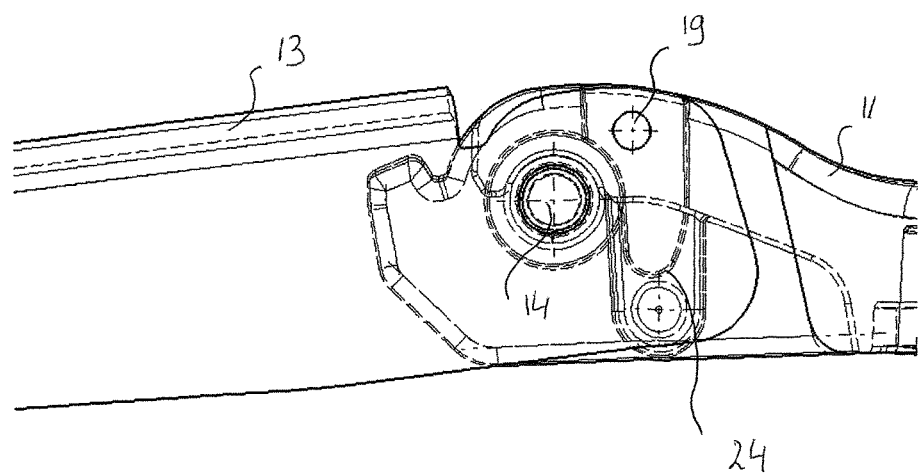
FIGS. 5 and 6 show a cross-sectional view of the wiper arm in wiping position and in mounting position, respectively.
Figure 6:
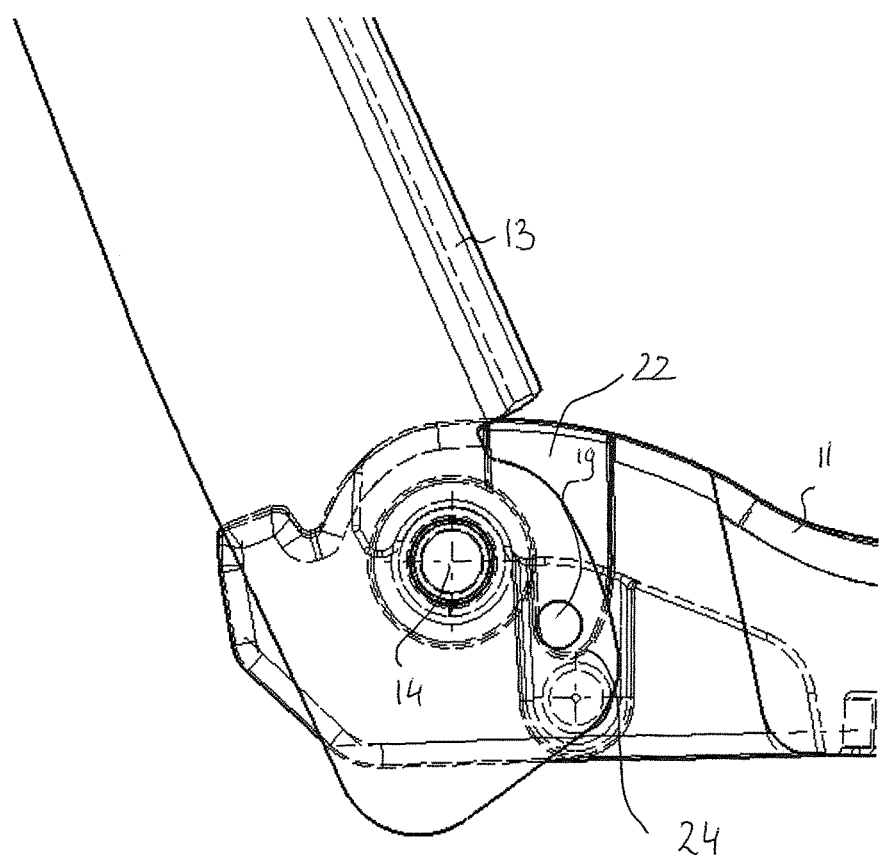
Figure 7:
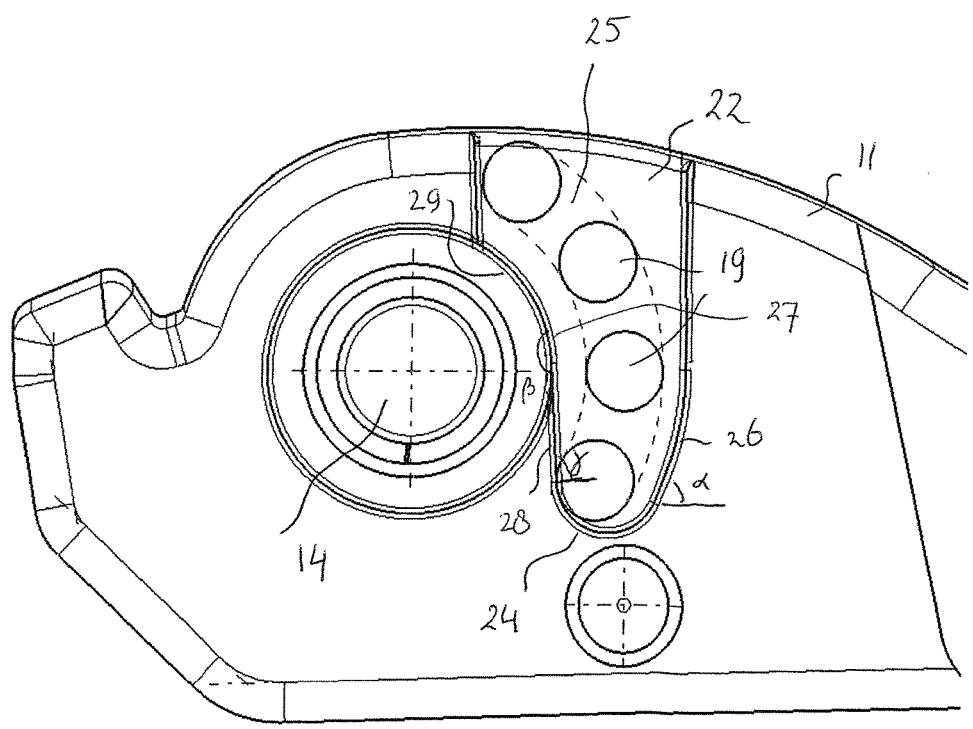
Figure 8:
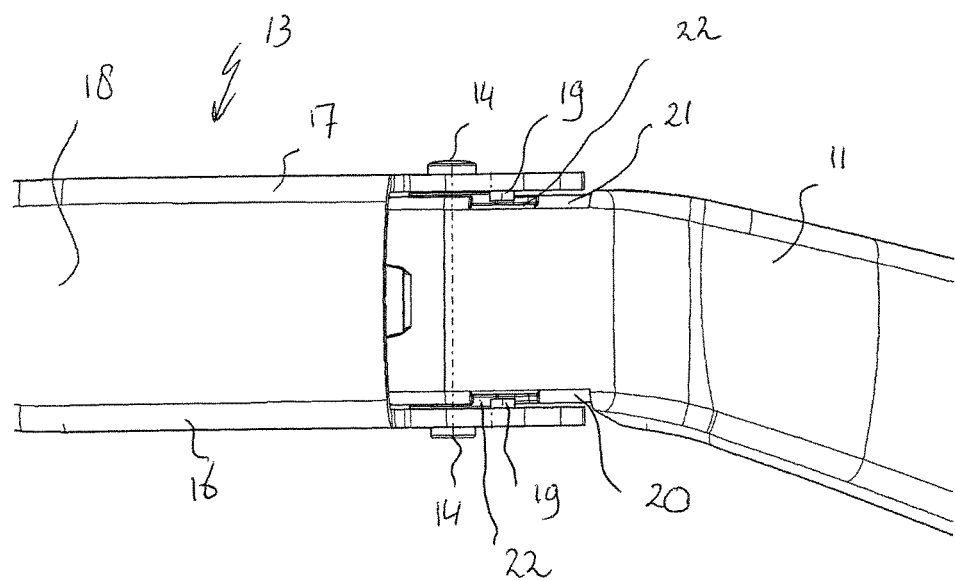

FIG. 7 correspond to FIGS. 5 and 6, but now showing how a protrusion on the arm member of the wiper arm is moved inside a groove on the mounting head of the wiper arm, when the latter is moved between the wiping position and the mounting position thereof; and FIG. 8 shows a top view of the wiper arm in wiping position.

DETAILED DESCRIPTION

Figure 1:
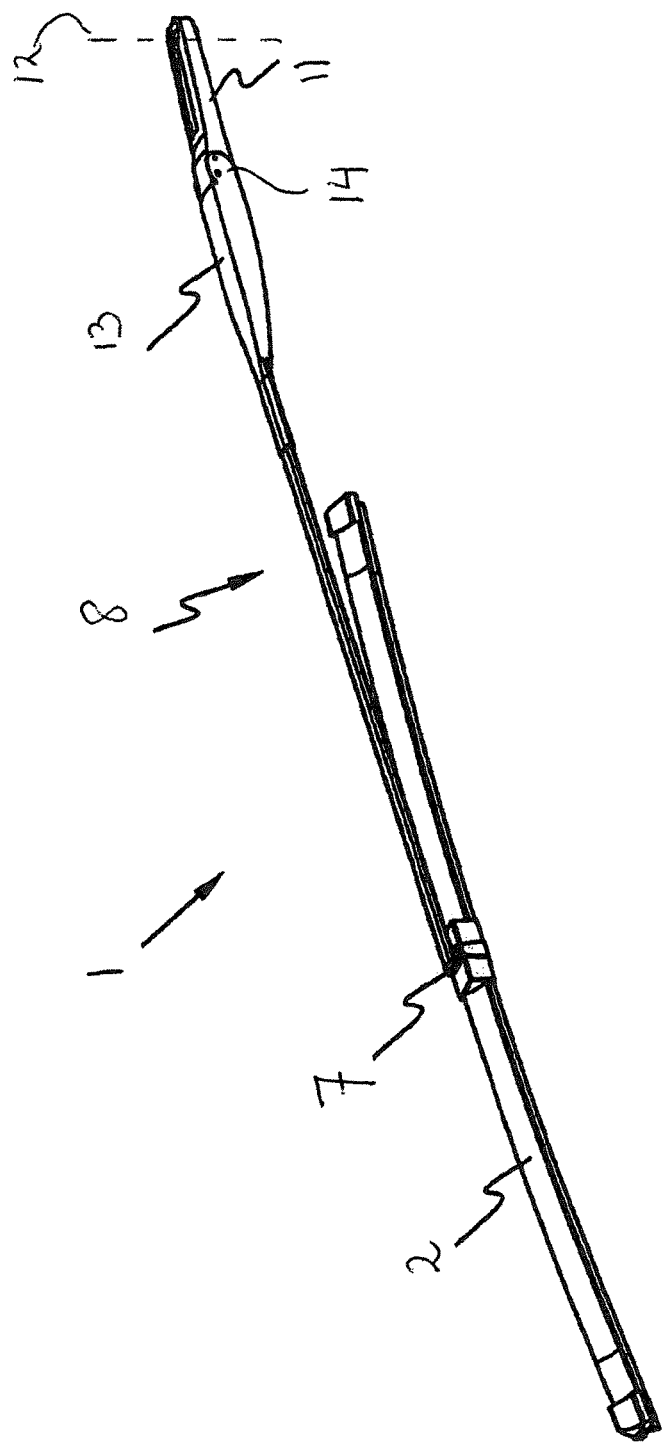
FIG. 1 is a perspective, schematic view of a preferred embodiment of a windscreen wiper device equipped with a windscreen wiper arm according to the invention, wherein the windscreen wiper arm is in a wiping position.
Figure 2:
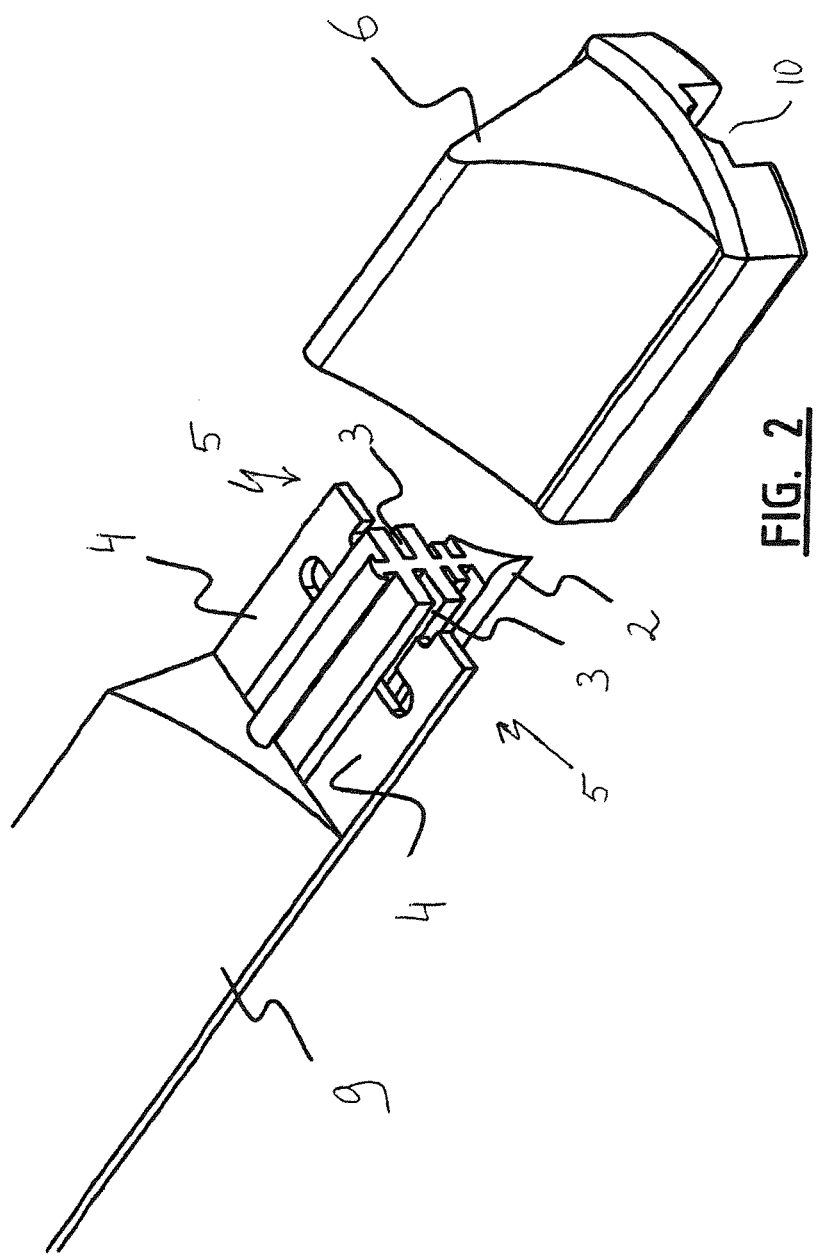
FIG. 2 shows a detail of the windscreen wiper device of FIG. 1.

FIGS. 1 and 2 show a preferred variant of a windscreen wiper device 1 according to the invention. the windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. the strips 4 form a flexible carrier element for the rubber wiper blade 2, as it were, which is thus biassed in a curved position (the curvature in operative position being that of a windscreen to be wiped). Neighbouring ends 5 of strips 4 are interconnected on either side of the windscreen wiper device 1 by means of connecting pieces 6 or "end caps". The windscreen wiper device 1 is further equipped with a connecting device 7 for an oscillating arm 8, and a spoiler 9.

FIG. 2 shows a free end of the windscreen wiper device 1 of FIG. 1. Corresponding parts have been designated with the same reference numerals. As can be seen from FIG. 2, the connecting piece 6 is provided with an opening 10 in order to allow a relative movement of the wiper blade 2 along the strips 4 inside the connecting piece 6, so that the connecting piece 6 does not block the wiper blade 2 during use. The connecting pieces 6 or "end caps" are made of one piece of plastic.

As illustrated in FIG. 1, the windscreen wiper arm 8 according to the invention comprises a steel mounting head 11 which can be fixed for rotation to a shaft 12 driven, via a mechanism not illustrated, by a small motor. the windscreen wiper arm 8 further comprises a aluminium arm member 13 supported by the mounting head 11, wherein the arm member 13 in turn supports the wiper blade 2 with the help of the connecting device 7. The arm member 13 is pivotally connected to the mounting head 11 by means of a pivot pin 14. In use, the shaft 12 rotates alternately in a clockwise and in a counter-clockwise sense carrying the mounting head 11 into rotation also, which in turn draws the arm member 13 into rotation and by means of the connecting device 7 moves the wiper blade 2.

Figure 3:
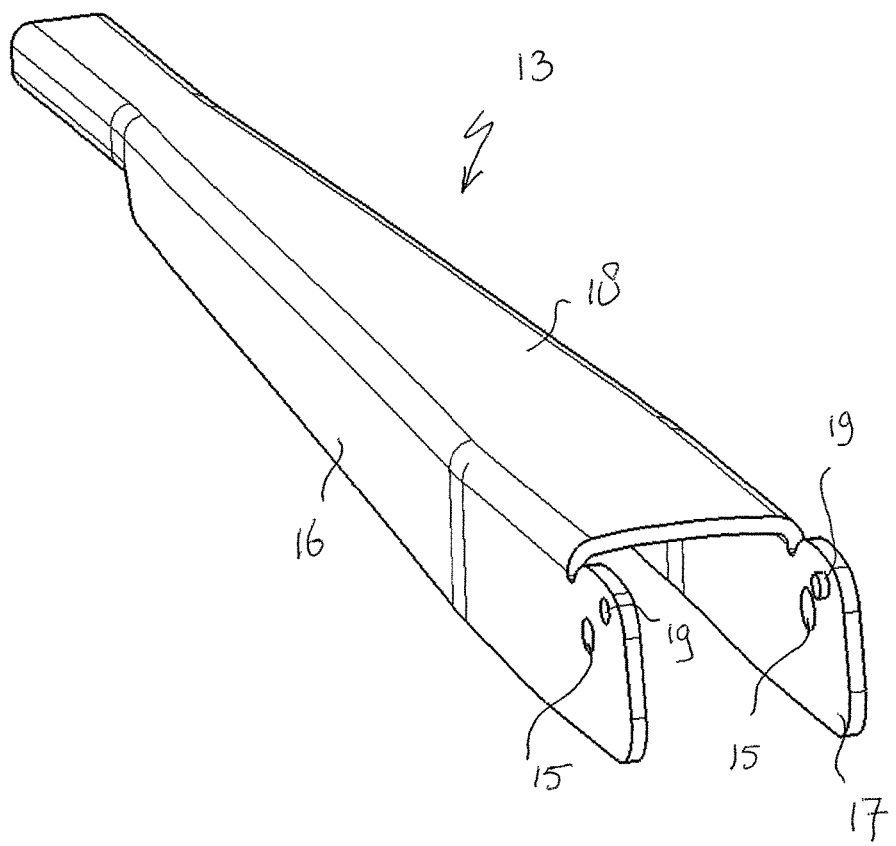
FIG. 3 is a perspective, schematic view of a preferred embodiment of an arm member according to the invention.
Figure 4:
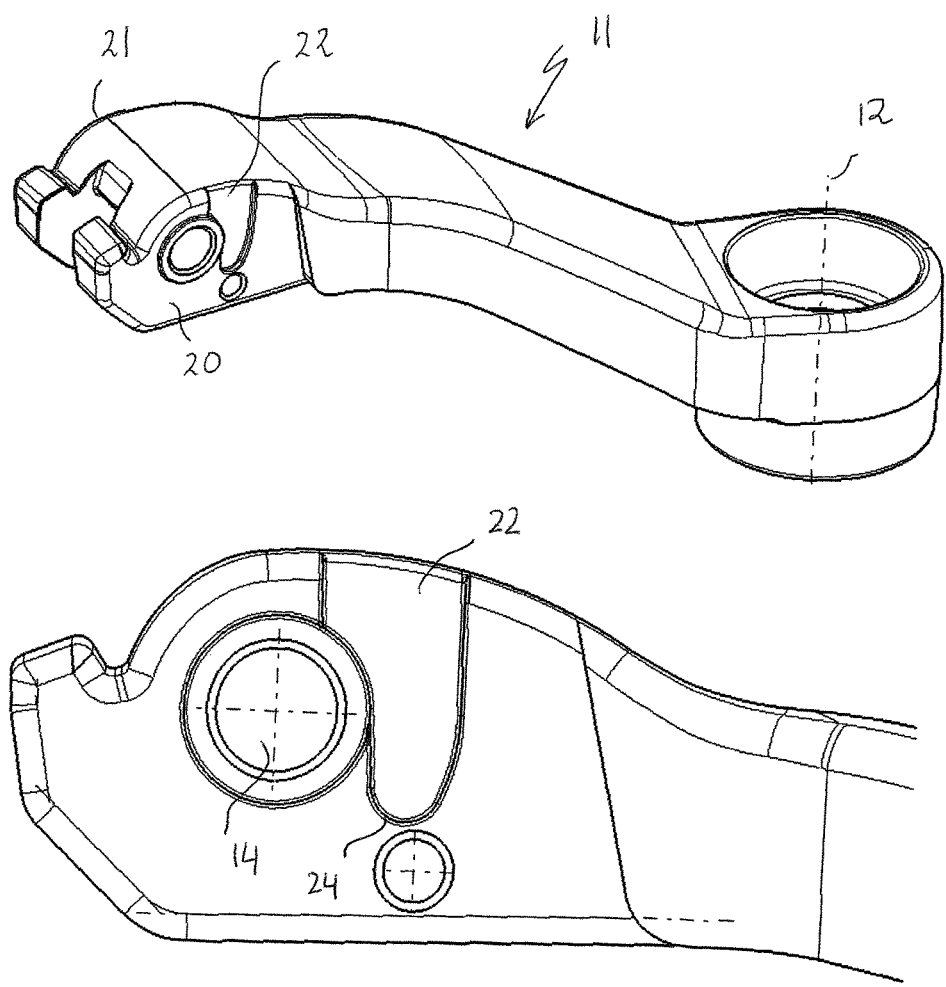
FIG. 4 is a perspective, schematic view, as well as a cross-sectional view of a preferred embodiment of a mounting head according to the invention.

As illustrated in FIG. 3, an arm member 13 according to the invention has a substantially U-shaped cross-section near the pivot pin 14 (inserted through co-axial openings 15 thereof) comprising two side walls 16,17 and a base 18. According to the invention the arm member 13 comprises in one piece therewith two inwardly extending cylindrical protrusions 19 having a similar shape. The function of the protrusions 19 will be explained hereunder.

With reference to FIGS. 1, 3 through 8, a part of the mounting head 11 extends between the side walls 16,17 of the arm member 13 and beyond the pivot pin 14. the part is provided with opposite abutting surfaces 20,21 for abutting against the side walls 16,17. Each abutting surface 20,21 of the part of the mounting head 11 is provided with a groove 22. the protrusions 19 are allowed to slide inside the grooves 22 between a "service position" (that is a mounting, cleaning and/or repair position, for example) and a "working position" (that is a wiping position, see FIG. 1) of the oscillating arm 8, as will be explained in detail further with the help of FIGS. 5 and 6. In the "service position" (FIG. 6) each protrusion 19 abuts against a curved end wall 24 ("extremity") of a corresponding groove 22, whereas in the "working position" (FIG. 5) the protrusions 19 are spaced-apart from the end walls 24 of the grooves 22. the protrusions 19 and the end walls 24 of the grooves 22 form stop surfaces avoiding that in the "service position" the arm member 19 is allowed to be pivoted beyond a predetermined angle with respect to the mounting head 11.

As shown in FIG. 7, the protrusions 19 are allowed to move in the grooves 22 between the first position and the second position each along a path 25 formed by a part of a circle. As depicted, the protrusions 19 are always spaced-apart from side-walls 26,27 of the grooves 22 during the movement. Only in the second position, the protrusions 19 abut against end walls 24 of the grooves 22.

The side walls 26 of the grooves 22 facing away from the pivot pin 14 extend along a straight line, enclosing an acute angle a with the horizontal plane. the side walls 27 of the grooves 22 facing towards the pivot pin 14 each comprises a first wall portion 28 adjacent to the end wall 24 and extending along a straight line, as well as a second wall portion 29 adjacent to the first wall portion 28. The first and second wall portions 28,29 of each side wall 27 enclose an obtuse angle β. Further, the first wall portion 28 of each side wall 27 encloses an acute angle γ with the horizontal plane.

The invention is not restricted to the embodiment shown, but extends also to other embodiments falling within the scope of the appended claims.

The invention claimed is:

1. A windscreen wiper arm, comprising:
a mounting head mountable on a drive shaft and an arm member pivotally connected to the mounting head by means of a pivot pin, wherein the arm member has a substantially shaped cross-section near said pivot pin and has two side walls,
wherein a part of the mounting head extends between the side walls of the arm member and beyond said pivot pin,
wherein said mounting head has at least one groove with groove side walls,
wherein said arm member has at least one protrusion which cooperates with said at least one groove,
wherein said at least one protrusion is movable in said at least one groove along a path between a first position corresponding with a wiping position of the arm member and a second position corresponding with a mounting position of the arm member,
wherein said part is provided with opposite abutting surfaces for abutting against the side walls of the arm member and wherein said at least one groove is provided on one of said abutting surfaces,
wherein said at least one protrusion extends laterally inwardly from one of the side walls of said arm member into said groove, and
wherein said groove side walls are spaced apart from one another in a direction that is transverse to the path by a width which is larger than a width of said protrusion such that said protrusion is movable along the path in said groove for the entire length between said first and second positions without making contact with said groove side walls.

2. The windscreen wiper arm according to claim 1, wherein in said second position said protrusion abuts against a curved end wall of said groove.

3. The windscreen wiper arm according to claim 2, wherein one of the groove side walls of said groove facing away from said pivot pin and adjacent to said curved end wall extends along a straight line.

4. The windscreen wiper arm according to claim 3, wherein said groove side wall of said groove away from said pivot pin encloses an acute angle α with a horizontal plane, and wherein said acute angle α is chosen between 20° and 85°.

5. The windscreen wiper arm according to claim 2, wherein said end wall extends along a part of a circle.

6. The windscreen wiper arm according to claim 2, wherein one of the groove side walls of said groove facing towards said pivot pin comprises a first wall portion adjacent to said end wall and extending along a straight line, as well as a second wall portion adjacent to said first wall portion, and wherein said first and second wall portions enclose an obtuse angle β.

7. The windscreen wiper arm according to claim 6, wherein said first wall portion of said groove side wall of said groove facing towards said pivot pin encloses an acute angle γ with a horizontal plane, and wherein said acute angle γ is at least 37° and no greater than 90°.

8. The windscreen wiper arm according to claim 1, wherein the arm member is made of a metal material.

9. The windscreen wiper arm according to claim 8, wherein the metal is steel.

10. The windscreen wiper arm according to claim 1, wherein the mounting head is made of a metal material.

11. The windscreen wiper arm according to claim 10, wherein the metal is aluminium.

12. The windscreen wiper device comprising a windscreen wiper arm according to claim 1.

13. The windscreen wiper device according to claim 12, wherein it comprises an elastic, elongated carrier element, as well as an elongated wiper blade of a flexible material, which can be placed in abutment with a windscreen to be wiped, which wiper blade includes at least one longitudinal groove, in which groove of said wiper blade a longitudinal strip of the carrier element is disposed, wherein ends of said longitudinal strip are connected by a respective connecting piece, which windscreen wiper device comprises a connecting device for the windscreen wiper arm.

14. A method for manufacturing a windscreen wiper arm, comprising the steps of:
preparing a mounting head mountable on a drive shaft; and
pivotally connecting an arm member to the mounting head by means of a pivot pin,
wherein the arm member has a substantially U-shaped cross-section near said pivot pin comprising two side walls,
wherein a part of the mounting head extends between the side walls of the arm member and beyond said pivot pin,
wherein the mounting head has at least one groove for limiting a pivot angle of the arm member,
wherein the at least one groove of the mounting head has groove side walls,
wherein the arm member has at least one protrusion which cooperates with said groove,
wherein said at least one protrusion is movable in said at least one groove along a path between a first position corresponding with a wiping position of the arm member and a second position corresponding with a mounting position of the arm member, wherein said part is provided with opposite abutting surfaces for abutting against the side walls of the arm member and wherein said at least one groove is provided on one of said abutting surfaces, wherein said at least one protrusion extends laterally inwardly from one of the side walls of said arm member into said groove, wherein wherein said groove side walls are spaced apart from one another in a direction that is transverse to the path by a width which is larger than a width of said protrusion such that said protrusion is movable along the path in said groove for the entire length between said first and second positions without making contact with the groove side walls of said groove.

* * * * *